United States Patent [19]

O'Connor, deceased

[11] 3,910,068
[45] Oct. 7, 1975

[54] JOINTS BETWEEN DRIVE AND DRIVEN SHAFTS

[75] Inventors: James Alexander O'Connor, deceased, late of Strathmore, Australia; by Andrew David Warne-Smith, administrator, Melbourne, Australia; by John Francis Radcliffe, administrator; by Kathleen Mary O'Connor, administrator, both of Strathmore, Australia

[73] Assignee: O.C. Mechanical Research and Engineering Company Pty. Ltd., Melbourne, Australia

[22] Filed: Mar. 15, 1974

[21] Appl. No.: 451,558

[30] Foreign Application Priority Data
Mar. 16, 1973 Australia............................ 2619/73

[52] U.S. Cl..................... 64/13; 64/11; 64/27 NM
[51] Int. Cl.².......................................... F16D 3/62
[58] Field of Search.......... 64/13, 11 R, 27 NM, 10, 64/27 R

[56] References Cited
UNITED STATES PATENTS

| | | | |
|---|---|---|---|
| 2,712,741 | 7/1955 | Roller | 64/13 |
| 2,972,240 | 2/1961 | Wood, Sr. | 64/11 |
| 3,478,539 | 11/1969 | Daur | 64/13 |

FOREIGN PATENTS OR APPLICATIONS

| | | | |
|---|---|---|---|
| 2,113,357 | 10/1971 | Germany | 64/13 |
| 883,087 | 7/1949 | Germany | 64/11 R |

*Primary Examiner*—Samuel Scott
*Assistant Examiner*—Randall Heald
*Attorney, Agent, or Firm*—Wigman & Cohen

[57] ABSTRACT

A joint between drive and driven shafts necessitating alignment therebetween comprises a first and second flanged socket adapted to rigidly retain therein a drive and driven shaft respectively. A disc of resilient material is located between the flanged sockets and is rigidly connected thereto. The disc has means on its outer periphery to radially restrain outward movement of the disc. A self-aligning bearing is located between the annular disc and the first flanged socket. The annular disc and bearing are adapted to receive an inner end of the driven shaft.

4 Claims, 2 Drawing Figures

JOINTS BETWEEN DRIVE AND DRIVEN SHAFTS

This invention relates to joints between drive and driven shafts of the type necessitating alignment between the two shafts. Joints of this type are, for example, commonly used in inboard motors.

Heretofore, as is well known, joints of the above type consisted merely of a direct metallic coupling between the two shafts using a pair of complemental flanged sockets. Joints of this type are subject to the defect that vibrations and accidental shocks, such as are frequently encountered with inboard motors during use, are frequently transmitted through the crankshaft to the body e.g. boat hull which carries the joint. Frequently, propeller shafts which are coupled by the above conventional joints break owing to the stresses produced by faulty alignment or distortion of the body carrying the joint. These problems may arise, for instance, in connection with an inboard motor where the boat is travelling at high speed through rough water. Again accidental shocks are often produced by the propeller hitting a sandbank or like obstacle.

Accordingly, it is the principal object of this invention to provide a joint of the type herein referred to which will eliminate vibration and shock emanating from the driven shaft.

With the above principal object in view, the invention provides a joint between drive and driven shafts necessitating alignment therebetween, comprising a first and second flanged socket adapted to rigidly retain therein a drive and driven shaft respectively, a disc of resilient material located between said flanged sockets and rigidly connected thereto having means on its outer periphery to restrain radially outward movement of said disc, and a self-aligning bearing located between said annular disc and the first flanged socket, said annular disc and bearing being adapted to receive the inner end of the driven shaft.

Conveniently, the first flanged socket is recessed so as to allow the protrusion of the driven shaft beyond the bearing.

The bearing is advantageously located in a recessed portion of said disc and said first flanged socket.

Preferably, the restraining means is constituted by an annular metal band, e.g. steel band.

The invention will now be described with reference to a preferred embodiment shown in the accompanying drawings wherein.

Figure 1:
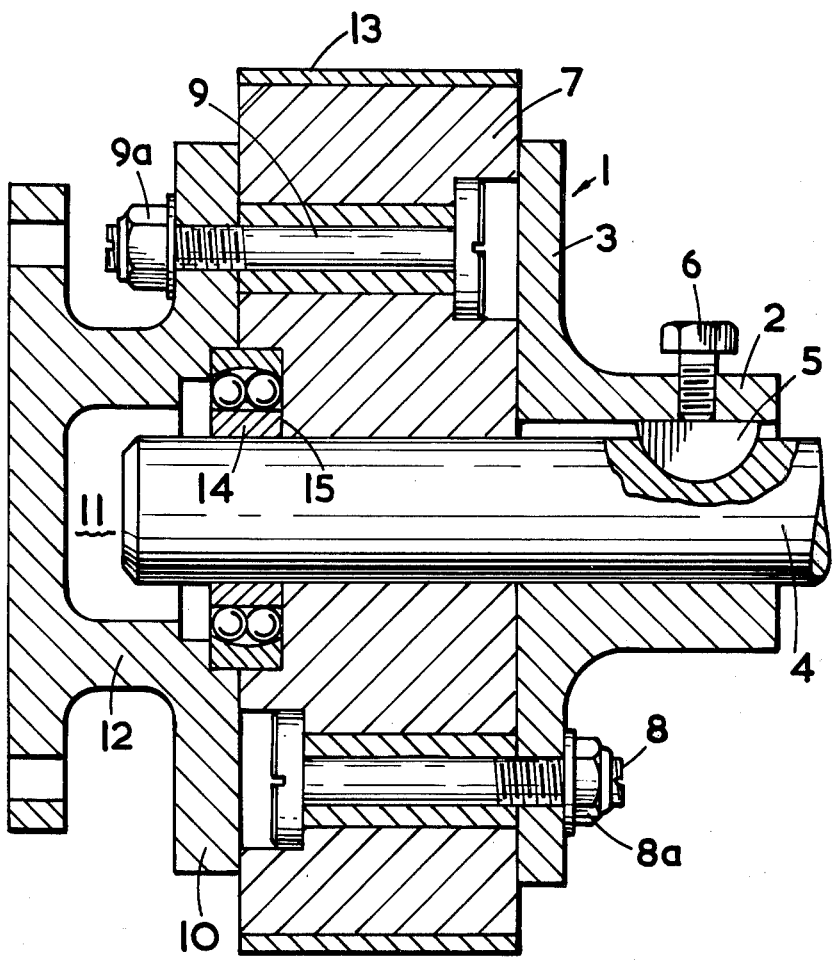
FIG. 1 is a cross-sectional elevation view of a joint between a drive and driven shaft.
Figure 2:
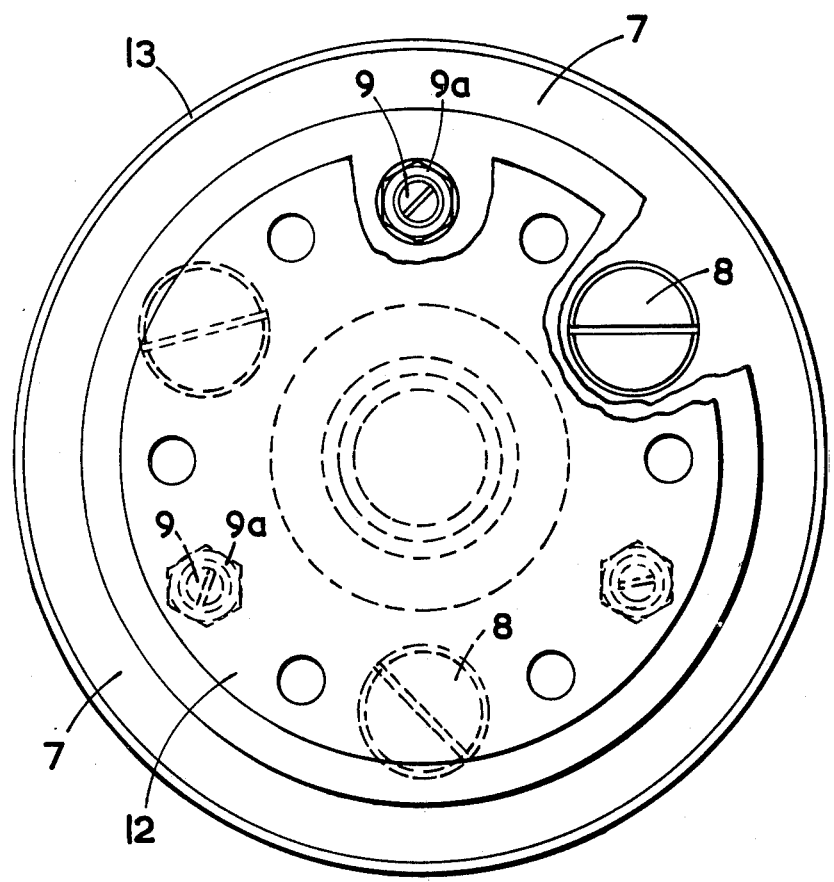
FIG. 2 is an end view of the joint shown in FIG. 1.

Referring to the drawings, a flanged socket, generally indicated as 1, consists of a boss portion 2 and a flanged portion 3. The boss portion 2 is rigidly connected to a driven shaft 4 by a key 5 and grub screw 6.

The flange 3 is rigidly connected to an annular rubber disc 7 by means of a number of bolts and nuts 8 and 8a, the disc 7 being also rigidly connected by bolts and nuts 9, 9a to the flange portion of a coupling member 12 adapted to receive a drive shaft (not shown).

The rubber disc 7 has an annular metal (e.g. steel) band 13 on its outer periphery.

A self-aligning ball bearing 14 is located in a recess 15 provided in the rubber disc 7 and flange 10. The driven shaft 4 extends through disc 7 and bearing 14 and protrudes into the recess 11.

It will be appreciated that as the inner end of the driven shaft is mounted in a rubber cushion as well as a self-aligning bearing, any sheer stress components of a vibration or shock will be absorbed by the resilient disc while any transverse components of such vibration or shock will be absorbed by the self-aligning bearing, the latter always ensuring subsequent re-alignment of the driven shaft with the drive shaft. As will also be appreciated, the driven shaft should preferably extend through the self-aligning bearing (as shown in the drawings), as distinct from actually terminating therein, so as to preserve a constant pivot point and to maximize the reduction of vibration.

The above invention, as will be appreciated, finds use in a number of specific applications such as, e.g. joints between crank and propeller shafts used with inboard motors and joints in all types of stationary motors.

I claim:

1. A joint between drive and driven shafts necessitating alignment therebetween, comprising a first and second flanged socket adapted to rigidly retain therein a drive and driven shaft respectively, an annular disc of resilient material located between said flanged sockets and rigidly connected thereto, said annular disc having means on its outer periphery to restrain radially outward movement of said disc, and means for preventing radial displacement between the drive and driven shafts including a self-aligning bearing located between said annular disc and said first flanged socket and rigidly mounted to said first flanged socket, said annular disc and bearing being adapted to receive the inner end of the driven shaft.

2. A joint as claimed in claim 1 wherein said first flanged socket is recessed so as to allow the protrusion of the driven shaft beyond the bearing.

3. A joint as claimed in claim 1 wherein said restraining means is constituted by an annular metal band.

4. A joint as claimed in claim 1 wherein said bearing is located in a recessed portion of said disc and said first flanged socket.

* * * * *